US012739455B2

(12) United States Patent
Yun

(10) Patent No.: US 12,739,455 B2
(45) Date of Patent: Sep. 15, 2026

(54) METHOD AND APPARATUS FOR DYNAMICALLY STREAMING HIGH RESOLUTION VIDEO BY USING GEOMETRY INFORMATION WITHIN VIDEO

(71) Applicant: ELECTRONICS AND TELECOMMUNICATIONS RESEARCH INSTITUTE, Daejeon (KR)

(72) Inventor: Jae Kwan Yun, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 12 days.

(21) Appl. No.: 18/925,953

(22) Filed: Oct. 24, 2024

(65) Prior Publication Data

US 2025/0142148 A1 May 1, 2025

(30) Foreign Application Priority Data

Oct. 25, 2023 (KR) ........................ 10-2023-0143660
Apr. 11, 2024 (KR) ........................ 10-2024-0048559

(51) Int. Cl.
*H04N 21/24* (2011.01)

(52) U.S. Cl.
CPC ............................... *H04N 21/2402* (2013.01)

(58) Field of Classification Search
CPC ......... H04N 21/2402; H04N 21/25841; H04N 21/2662
See application file for complete search history.

(56) References Cited

U.S. PATENT DOCUMENTS 2,357,137 A 8/1944 Schneider
9,232,505 B2 1/2016 Oh et al.
2009/0249413 A1* 10/2009 Karaoguz ........ H04N 21/41407 725/105

(Continued)

FOREIGN PATENT DOCUMENTS

CN 115022685 A * 9/2022 ......... H04N 21/2662
KR 10-2023-0055363 A 4/2023

OTHER PUBLICATIONS

An English translation of CN 115022685 A Jun. 2, 2022 (Year: 2022).*

*Primary Examiner* — Gigi L Dubasky

(57) ABSTRACT

The present disclosure relates to a method and an apparatus for dynamically streaming a high-resolution video by using geometry information within the video. According to an embodiment, the present disclosure provides a video streaming apparatus comprising: a stream receiving unit for receiving a video stream including a first video and first location information from a first mobile terminal; a location information obtaining unit for obtaining the first location information of the first mobile terminal from the video stream; a bandwidth information obtaining unit for obtaining first bandwidth information of the first mobile terminal by referring to a bandwidth table of the first mobile terminal according to the first location information; and a bandwidth information transmitting unit for transmitting the first bandwidth information to the first mobile terminal.

6 Claims, 10 Drawing Sheets

(56) References Cited

U.S. PATENT DOCUMENTS

| | | | | |
|---|---|---|---|---|
| 2018/0160433 | A1 | 6/2018 | Kim et al. | |
| 2019/0180586 | A1 | 6/2019 | Script | |
| 2019/0200274 | A1* | 6/2019 | Lautenschlaeger | H04W 4/44 |
| 2019/0265694 | A1 | 8/2019 | Chen et al. | |
| 2023/0309072 | A1* | 9/2023 | Tran | H04B 7/18506 |
| 2024/0089845 | A1* | 3/2024 | Shahid | H04W 16/14 |

* cited by examiner

METHOD AND APPARATUS FOR DYNAMICALLY STREAMING HIGH RESOLUTION VIDEO BY USING GEOMETRY INFORMATION WITHIN VIDEO

CROSS-REFERENCE TO RELATED APPLICATIONS

The present application is based on and claims the benefit of priority to Korean Patent Application Number 10-2023-0143660, filed on Oct. 25, 2023, and Korean Patent Application Number 10-2024-0048559, filed on Apr. 11, 2024 in the Korean Intellectual Property Office, the entire disclosure of which is incorporated herein by reference.

TECHNICAL FIELD

The present disclosure relates to a method and an apparatus for dynamically streaming a high-resolution video by using geometry information within the video.

BACKGROUND

The statement herein merely provides background information related to the present disclosure and may not necessarily constitute the prior art.

FIG. 1A is a view comparing a mission zone for a 4K UHD video drone compared to an FHD video drone.

A drone 101 with a 4K UHD video function can capture pictures four times wider than FHD (Full High Definition) images, which enables it to take shots at higher altitudes than a drone 102 with an FHD video function.

4K UHD image transmission requires higher bitrates for video input into an AI function compared to the existing FHD image transmission. In general, FHD images require a bitrate of 4 Mbps, and 4K UHD requires a bitrate between 8 and 14 Mbps.

With advances in commercial 5G and e-Um (Private 5G) technologies, real-time transmission of 4K UHD images is becoming feasible.

As drones, 5G (5-th Generation) networks, and AI (Artificial Intelligence) technologies advance, services for delivering high-resolution images captured by a drone using a 5G network and inputting them into the AI function are increasingly deployed.

In General, 5G networks support 1 Gbps downlink and 100~300 Mbps uplink for a single base station terminal. That is, a single terminal has an upload speed of up to 100~300 Mbps and a download speed of up to 1 Gbps. Private 5G such as e-Um 5G offers uploading and downloading in a higher frequency band.

When searching for a missing person using a drone, a number of drones are sometimes flown simultaneously to send still images or video, in order to reduce searching time.

Delivering high-resolution images such as 4K images (i.e., 4K resolution images) basically requires a bandwidth of 10 to 12 Mbps or higher. However, if the bandwidth exceeds a certain limit (typically, 100 Mbps) up to which the base station can handle traffic, streaming and control will be stopped all at once due to network traffic. In this case, one or more of the drones need to lower the bandwidth or stop streaming so that the drones can be controlled and stream again.

FIG. 1B is a view illustrating an example of selecting a resolution using an existing adaptive bitrate technology in a conventional video streaming system.

Traditionally, adaptive streaming technology is used to vary the resolution and bitrate of videos transmitted by a terminal 110 depending on the network transmission situation of the UE 110. In this case, however, the technology is used mostly for Video on Demand (VOD). Moreover, videos used for video input into the AI function by a media server 120 mostly have a fixed resolution, but, for the AI function, it is difficult to use them when streaming videos at varying resolutions in real time.

In mobile network environment such as 5G/LTE (Long Term Evolution) networks, the networks fluctuate wildly depending on the location of the base station. Notably, 5G networks offer frequency bandwidths that make it possible to send large volumes of data within a short time, but, as opposed to wired networks, their bandwidth fluctuates severely depending on the location of the base station, the status of the terminal 110, and so on.

Most of the current commercially available 5G networks use NSA (non-standalone) mode in which a base station can't stand alone but instead LTE and the base station are used together. Thus, they can cover traffic for a given area by properly deploying the base station through cell planning.

Propagation from the base station ideally has a circular pattern when viewed from directly above, but, in reality, the coverage of the base station may change frequency just like an amoeba.

Moreover, any interference between base stations can deteriorate the quality of calls or data transmission. Also, although the location of the base station does not change, a mobile terminal 110, i.e., a drone, keeps changing its location. Thus, the mobile terminal 110 may not be able to perform high-resolution video streaming properly due to its location with respect to the base station or a propagation failure caused by neighboring terminals.

Previous studies on video streaming involve a method of generating streams at different resolutions and bitrates for different quality levels of streams and dynamically switching among them depending on the network condition of the terminal 110. This can be observed only after network traffic has reached its limit, making it impossible to control the drone because the traffic that has already occurred.

To provide users with videos at optimal bitrates by using the existing ABR approach, a conventional video streaming system 100 segments a source video obtained from a video terminal 110 into fragments 121 of a size suitable to be encoded by the media server 120 to generate a video package 122.

The media server 120 encodes the video package 122 by an encoder 123 at varying resolutions and bitrates and stores an encoded video.

When the encoded video is provided from the media server 120 to a display terminal 130, streaming begins at a resolution and bitrate that are optimal for the network condition.

A network check feature 140 checks for a bandwidth change while checking the RTT (Round Trip Time) delivered to the user through the display terminal 130. The media server 120 receives information on a change in bandwidth from the network check feature 140, and sends the video to the display terminal 130 at 320×240 resolution in a poor network condition, at 1280×720 in an average network condition, and at 3840×2160 resolution in a good network condition, according to the change in bandwidth.

This structure is suitable when the media server 120 relaying a video to the display terminal 130 for streaming the video is in a stable network condition; however, it might be difficult to perform streaming at a specified bitrate if the wireless condition of the mobile terminal changes periodically and cell planning is not properly performed.

The bitrate may be selected from among 254 kbps (320×180), 507 kbps (320×180), and 1,493 kbps (3840×2160), as shown in FIG. 1B, or else the bitrate of a video may be automatically adjusted. In the latter case, the bitrate changes automatically during video streaming depending the network environment, and therefore, upon receiving the video, the display terminal may display the video, with the resolution going up and down in real time.

In this instance, however, a video stream corresponding to each quality level needs to be generated in advance, which is not suitable for live streaming. Subsequently, the existing streaming methods such as ABR still have the drawback that, if the video terminal 110 is a mobile terminal that can be flown, that is, while the mobile terminal 110 is flying, videos obtained from the mobile terminal 110 are hard to use in real time for services such as AI video analysis.

Moreover, the MBR method has the issue that, similarly to ABR, a video stream corresponding to each resolution level needs to be generated in advance.

SUMMARY

In view of the above, the present disclosure provides a method and an apparatus for dynamically streaming a high-resolution video by using geometry information within the video.

The aspects of the present disclosure are not limited to the foregoing, and other aspects not mentioned herein will be able to be clearly understood by those skilled in the art from the following description.

According to an embodiment, the present disclosure provides a video streaming apparatus comprising: a stream receiving unit for receiving a video stream including a first video and first location information from a first mobile terminal; a location information obtaining unit for obtaining the first location information of the first mobile terminal from the video stream; a bandwidth information obtaining unit for obtaining first bandwidth information of the first mobile terminal by referring to a bandwidth table of the first mobile terminal according to the first location information; and a bandwidth information transmitting unit for transmitting the first bandwidth information to the first mobile terminal.

According to another embodiment, the present disclosure provides a mobile terminal comprising: an image receiving unit for receiving a first video from a camera mounted on the mobile terminal and encoding the same; a location data obtaining unit for obtaining first location information of the mobile terminal from a sensor mounted on the mobile terminal; a video stream transmitting unit for generating a video stream packet including the encoded, first video and the first location information and transmitting the video stream packet to a video streaming apparatus; and a resolution deciding unit for obtaining first bandwidth information from the video streaming apparatus and deciding a resolution for encoding the first video according to the first bandwidth information.

According to another embodiment, the present disclosure provides a video streaming method comprising: a stream receiving process for receiving a video stream packet including a first video and first location information from a first mobile terminal; a location information obtaining process for obtaining the first location information of the first mobile terminal from the video stream packet; a bandwidth information obtaining process for obtaining first bandwidth information of the first mobile terminal by referring to a bandwidth table of the first mobile terminal according to the first location information; and a bandwidth information transmitting process for transmitting the first bandwidth information to the first mobile terminal.

According to another embodiment, the present disclosure provides a video streaming method performed by a mobile terminal, comprising: a video receiving process for receiving a first video from a camera mounted on the mobile terminal and encoding the same; a location data obtaining process for obtaining first location information of the mobile terminal from a sensor mounted on the mobile terminal; a video stream transmitting process for generating a video stream packet including the encoded, first video and the first location information and transmitting the video stream packet to a video streaming apparatus; and a resolution deciding process for obtaining first bandwidth information from the video streaming apparatus and deciding a resolution for encoding the first video according to the first bandwidth information.

According to another embodiment, the present disclosure provides a video streaming method comprising: a video receiving process in which a first mobile terminal receives a first video from a camera mounted on the mobile terminal and encodes the same; a location data obtaining process in which the first mobile terminal obtains first location information of the mobile terminal from a sensor mounted on the mobile terminal; a video stream transmitting process in which the first mobile terminal generates a video stream packet including the encoded, first video and the first location information and transmits the video stream packet to a video streaming apparatus; a stream receiving process in which the video streaming apparatus receives a video stream packet including a first video and first location information; a location information obtaining process in which the video streaming apparatus obtains the first location information of the first mobile terminal from the video stream packet; a bandwidth information obtaining process in which the video streaming apparatus obtains first bandwidth information of the first mobile terminal by referring to a bandwidth table of the first mobile terminal according to the first location information; a bandwidth information transmitting process in which the video streaming apparatus transmits the first bandwidth information to the first mobile terminal; and a resolution deciding process in which the first mobile terminal obtains the first bandwidth information and decides a resolution for encoding the first video according to the first bandwidth information.

As described above, according to an embodiment of the present disclosure, a mobile terminal that performs repetitive missions in a specific area is able to artificially deal with problems such as network traffic, interference, etc.

The bitrate of a video stream may be changed, or a stream being played may be stopped, depending on the mobile terminal's location in the plane and its altitude, by using information from the mobile terminal's GPS and sensors.

Using this technique, a drone, for instance, may begin streaming at a low resolution bitrate while landed on the ground, and then stream at a high-resolution bitrate when the bandwidth returns to its normal 5G/LTE bandwidth at a certain altitude, and then dynamically lowers the bitrate due to a 5G/LTE shadow area or a network interference caused by some other drone approaching, thereby allowing for smooth streaming.

The effects of the present disclosure are not limited to the foregoing, and other effects not mentioned herein will be able to be clearly understood by those skilled in the art from the following description.

DETAILED DESCRIPTION

Figure 1A:
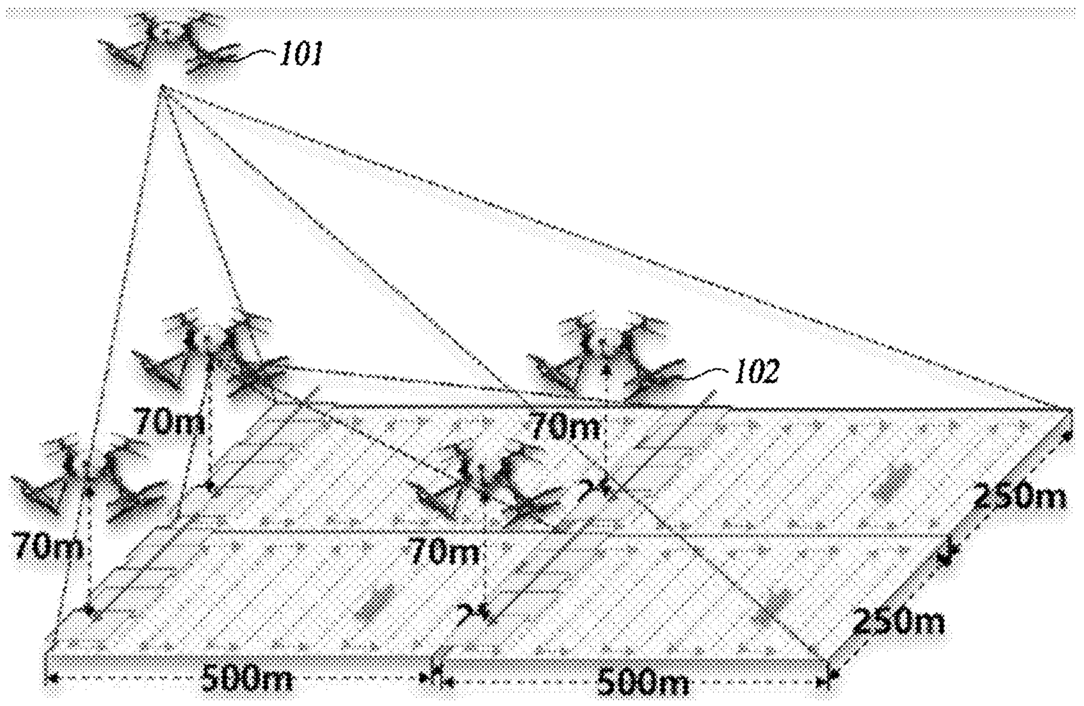
FIG. 1A is a view comparing a mission zone for a 4K UHD video drone compared to an FHD video drone.
Figure 1B:
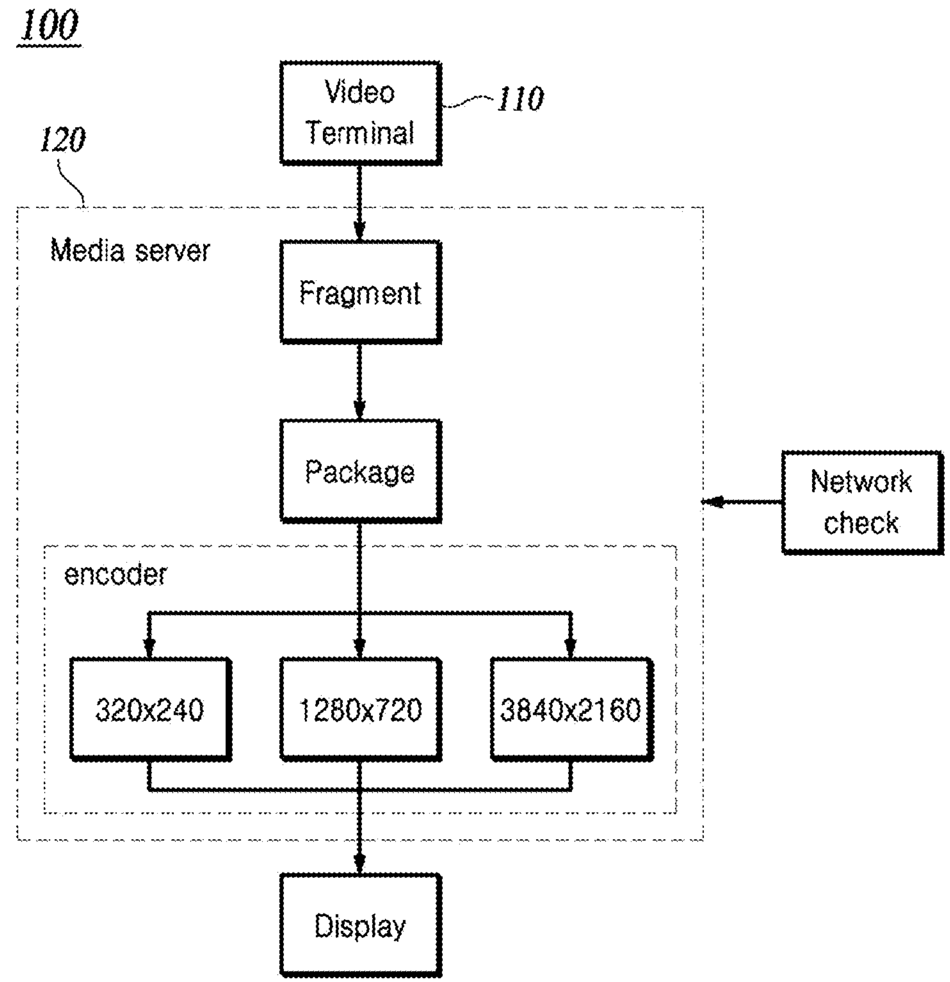
FIG. 1B is a view illustrating an example of selecting a resolution using an existing adaptive bitrate technology in a conventional video streaming system.

Hereinafter, embodiments of the present disclosure are described in detail with reference to the accompanying drawings. In the following description, like reference numerals designate like elements, although the elements are shown in different drawings. Further, in the following description of some embodiments, a detailed description of known functions and configurations incorporated therein has been omitted for the purpose of clarity and for brevity.

Additionally, various terms such as first, second, A, B, (a), (b), etc., are used solely to differentiate one component from the other but not to imply or suggest the substances, order, or sequence of the components. Throughout the present disclosure, when a part 'includes' or 'comprises' a component, the part is intended to further include other components and not intended to exclude other components unless specifically stated to the contrary.

The following detailed description, together with the accompanying drawings, is intended to illustrate embodiments of the present disclosure and is not intended to represent the only embodiments in which the disclosure may be practiced.

Figure 2A:
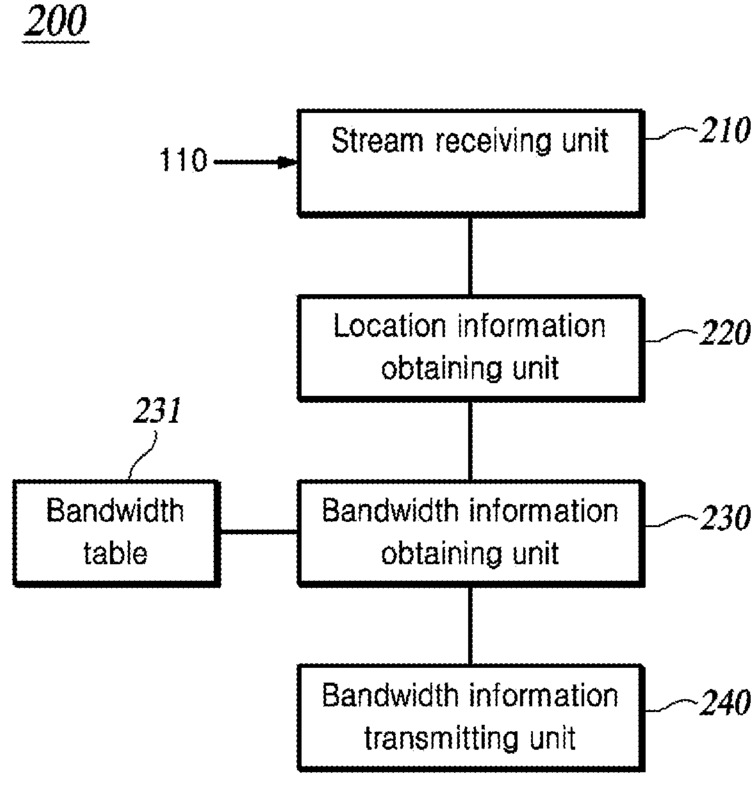
FIG. 2A is a block diagram of components of a video streaming apparatus according to an embodiment of the present disclosure.
Figure 2B:
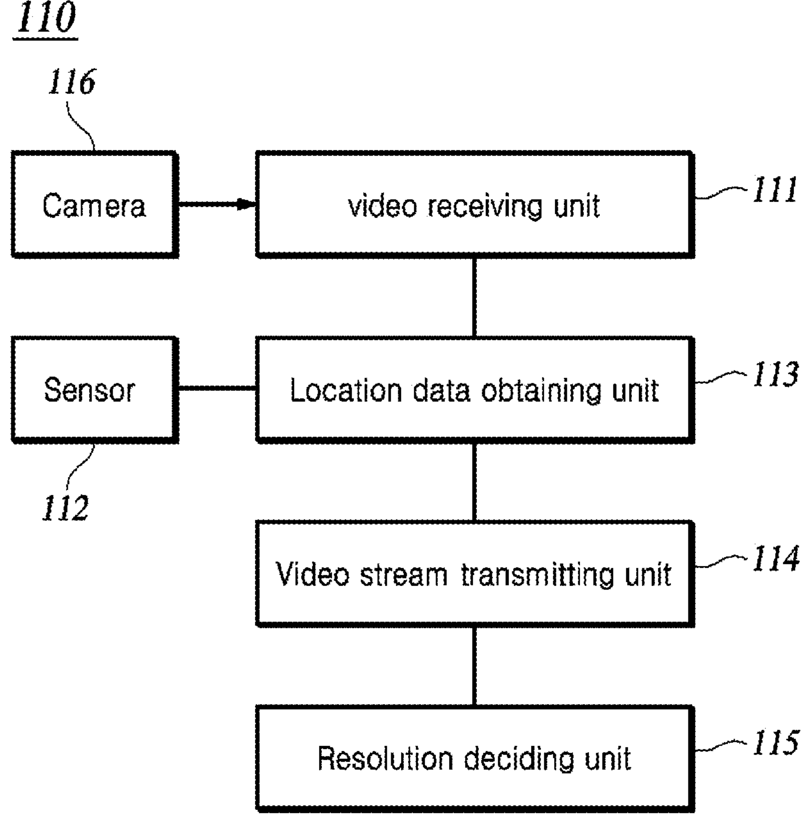
FIG. 2B is a block diagram of components of a mobile terminal according to an embodiment of the present disclosure.

FIG. 2A is a block diagram of components of a video streaming apparatus according to an embodiment of the present disclosure. FIG. 2B is a block diagram of components of a mobile terminal according to an embodiment of the present disclosure.

As illustrated in FIG. 2A, the video streaming apparatus 200 according to this embodiment includes a stream receiving unit 210, a location information obtaining unit 220, a bandwidth information obtaining unit 230, and a bandwidth information transmitting unit 240, a bitrate obtaining unit 250, and a bitrate adjusting unit 260. The video streaming apparatus 200 according to this embodiment may be implemented, with the omission of some of the components in FIG. 2A, or with the addition of other components not shown in FIG. 2A.

As illustrated in FIG. 2B, the mobile terminal 110 according to this embodiment includes an image receiving unit 111, a location data obtaining unit 113, a video stream transmitting unit 114, and a resolution deciding unit 115. The mobile terminal 110 according to this embodiment may be implemented, with the omission of some of the components in FIG. 2B, or with the addition of other components not shown in FIG. 2B.

Figure 3:
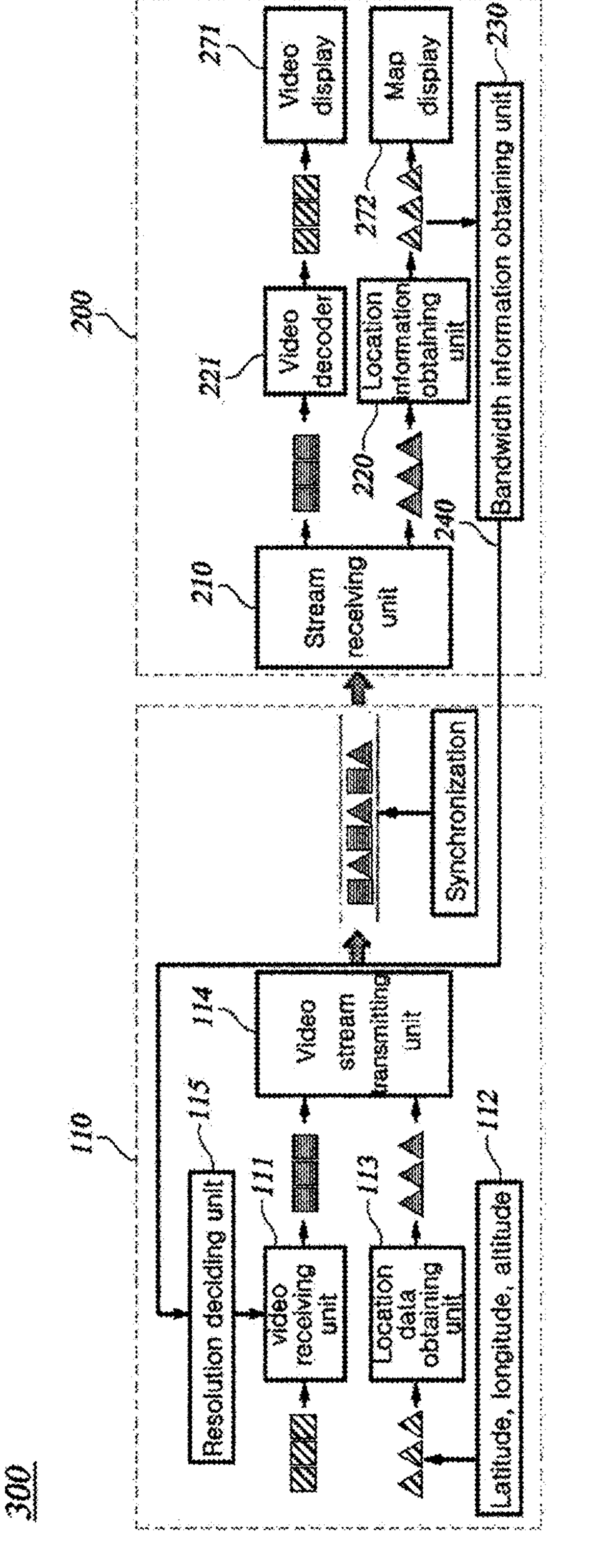
FIG. 3 is a view depicting a structure for handling a 4K video stream including a 4K video and geometry information, in a video streaming system according to an embodiment of the present disclosure that includes a mobile terminal and a video streaming apparatus.

FIG. 3 is a view depicting a structure for handling a 4K video stream including a 4K video and geometry information, in a video streaming system 300 according to an embodiment of the present disclosure that includes a mobile terminal 110 and a video streaming apparatus 200.

In the video streaming system 300 according to this embodiment, a 4K video stream structure including a 4K video and geometry information conforms to, but not limited to, Standard (ST) 0601 of MISB (Motion Imagery Standards Board).

Figure 4:
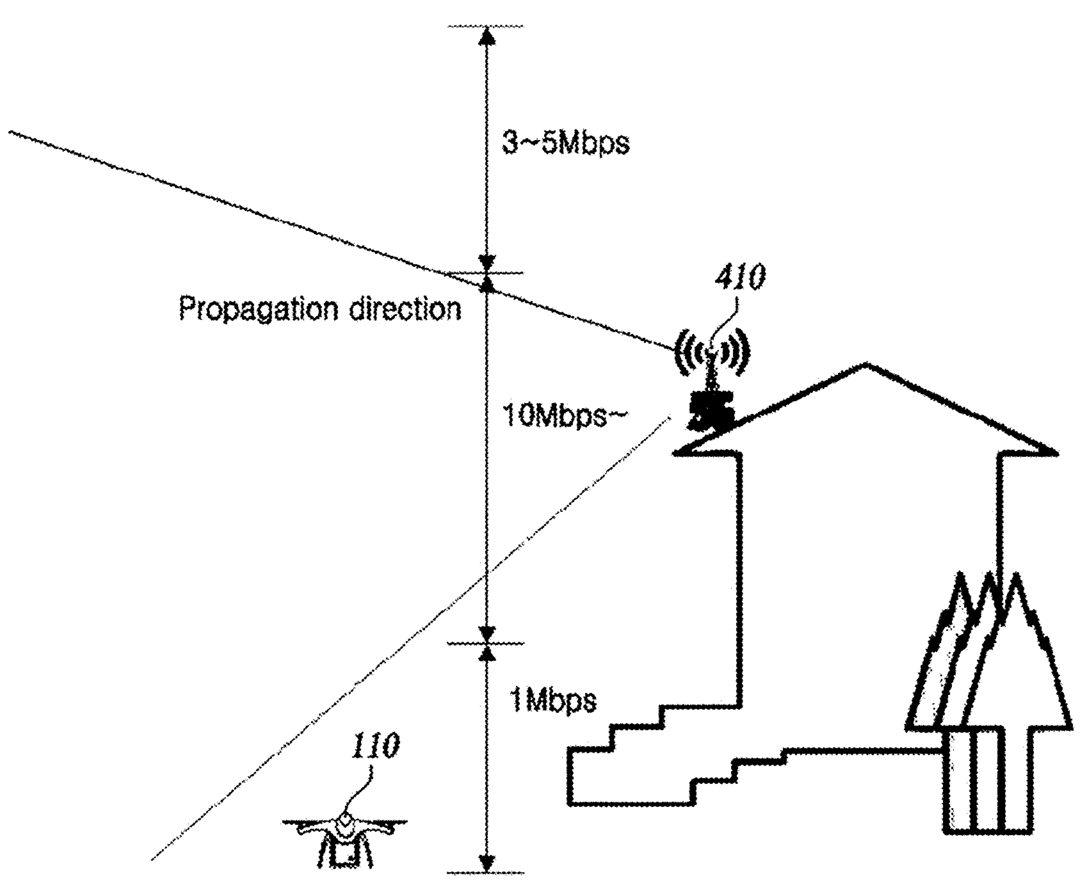
FIG. 4 is a view illustrating an example of dynamic application of bitrates for different altitudes at which a drone flies.

FIG. 4 is a view illustrating an example of dynamic application of bitrates for different altitudes at which a drone flies.

Here, the mobile terminal 110 may be a flying object such as a drone, but the present disclosure is not limited to this.

In the following description, it is assumed that a drone is a mobile terminal 110 (that is, a first mobile terminal 110), and in this embodiment, the terms "drone 110", "mobile terminal 110", and "first mobile terminal 110" may be interchangeably used.

Hereinafter, the video streaming system 300 according to this embodiment will be described with reference to FIGS. 2A to 5.

In the first mobile terminal 110, the image receiving unit 11 receives a first video captured by a camera 116 mounted on the first mobile terminal 110.

Here, the camera 116 may refer to various types of image generating devices including a regular imaging camera, an infrared camera, a radar, and a LiDAR sensor.

The camera 116 captures a first video and provides the captured first video frame by frame (V1, V2, and V3) to the image receiving unit 111.

The image receiving unit 111 encodes the frame-by-frame first video at a first resolution to generate a frame-by-frame encoded, first video, and provides the frame-by-frame encoded, first video to the video stream transmitting unit 114.

The location data obtaining unit 113 obtains first location information of the first mobile terminal 110 from a sensor 112 mounted on the first mobile terminal 110.

The sensor 112 is for sensing at least one of the latitude, longitude, and altitude of the location of the first mobile terminal 110 (that is, a point where the first mobile terminal 110 is located), and may be configured as an aggregate of sensors including some or all of a latitude/longitude sensor for sensing the latitude and longitude of the current location of the first mobile terminal 110 and an altitude sensor for sensing the altitude of the location of the first mobile terminal 110. In the following description, it is assumed that the sensor 112 senses the latitude, longitude, and altitude of the location of the first mobile terminal 110.

The sensor 112 obtains the latitude, longitude, and altitude of the location of the drone 110. Here, the latitude, longitude, and altitude of the location of the drone 110 is also referred to as geometry information of the drone 110. The intervals at which the sensor 112 obtains latitude, longitude, and altitude may be the same as the intervals at which the camera 116 generates frames by capturing a video.

The location data obtaining unit 113 may encode information on the latitude, longitude, and altitude received from the sensor 112 to generate first metadata M1, M2, and M3 and then provide the first metadata M1, M2, and M3 to the video stream transmitting unit 114.

The video stream transmitting unit 114 generates a video stream (i.e., a video stream packet) by multiplexing the first video (i.e., the encoded, first video) received from the image receiving unit 111 and the first metadata (i.e., the encoded, first location data) received from the location data obtaining unit 113, and transmits the generated video stream packet to the video streaming apparatus 200.

The video stream transmitting unit 114 synchronizes the frame-by-frame encoded, first video and the first metadata and sequentially aligns them to form a video stream packet. For the synchronization of the encoded, first video and the first metadata, PTS (Presentation TimeStamp), DTS (Decoding TimeStamp), etc. are configured. The synchronized video stream packet is provided to the video streaming apparatus 200 via a wireless network.

For reference, the video stream transmitting unit 114 may be implemented as an MPEG TS-2 Muxer.

The resolution deciding unit 115 receives first bandwidth information from the video streaming apparatus 200, decides an encoding resolution for the image receiving unit 111 according to the first bandwidth information, and determines the decided encoding resolution as a first resolution.

Here, the first bandwidth information refers to bandwidth information that corresponds to the first location information included in the first metadata.

The first bandwidth information may be implemented to include information on the range of a specific area that includes a location corresponding to the first location information. In this case, the video stream transmitting unit 114 may be implemented in such a manner that the first location information is not transmitted to the video streaming apparatus 200 unless the location of the mobile terminal 110 is outside the range of a specific area, even if the first mobile terminal 110 obtains the first location information, and that the first location information is transmitted to the video streaming apparatus 200 if the location of the first mobile terminal 110 is outside the range of a specific area. In this way, the first location information may be selectively transmitted to the video streaming apparatus 200, thereby reducing the overhead of transmitting the first location information by the first mobile terminal 110 and the overhead of searching for bandwidth information corresponding to the first location information by the video streaming apparatus 200.

In the video streaming apparatus 200, the stream receiving unit 210 receives a video stream (i.e., a video stream packet) from the drone 110 via a wireless network.

Here, the wireless network may refer to various types of networks such as a 5G network, LTE, and WiFi.

The stream receiving unit 210 may be implemented as an MPEG TS-2 Demuxer.

The stream receiving unit 210 separates a first video (i.e., an encoded, first video) and first metadata from a video stream and transmits them to a video decoder 221 and the location information obtaining unit 220, respectively.

The video decoder 221 decodes the first video frame by frame and provides it to the video display 271. The video display 271 displays the decoded first video frame by frame.

The location information obtaining unit 220 obtains first location information by decoding the first metadata. The location information obtaining unit 220 provides the first location information to a map display 272, and the map display 272 may be implemented to display the first location information on a map.

Here, the first location information also may be called geometry information, and may include at least one of the latitude, longitude, and altitude of the drone 110.

The bandwidth information obtaining unit 230 obtains first bandwidth information of the drone 110 by referring to a bandwidth table 231 for the drone 110 according to the first location information.

For mobile communication, the communication performance is determined according to the location of the base station 410 and the location of the mobile terminal 110.

Suppose that the mobile terminal is a drone 110, for example. While landed on the ground, the drone 110 may not be within the coverage of a 5G base station 410 due to topographical features.

In this instance, the drone 110 connects to a control station by using mobile communication and prepares for flight. If an initial bitrate for videos is set higher than an available bandwidth, the network becomes unstable, and even worse, the network for flight control becomes inoperable and the connection for controlling the drone 110 may be lost.

To prevent this, in this embodiment, the bandwidth may be set to adapt to the latitude, longitude, and altitude of the drone 110, and since the altitude of the drone 110 changes after the drone 110 takes off, the wireless bandwidth of the drone 110 may be automatically adjusted according to the latitude, longitude, and altitude information, thereby overcoming the network traffic problem.

In some embodiments, only the latitude and longitude of the drone 110 may be taken into consideration as geometry information for determining the wireless bandwidth of the drone 110, or only the altitude of the drone 110 may be taken into consideration, or the latitude, longitude, and altitude of the drone 110 may be altogether taken into consideration.

In the existing technology, if traffic occurs after video streaming starts, the bandwidth is adjusted after the wireless network becomes unstable or stops operating. If the network becomes unstable while the drone 110 is flying, this affects all control processes, such as flight control and status check, and an RTH (Return to Home) function may be enabled according to the drone's settings to get the drone to fly back to the point of take-off.

Nevertheless, by changing the bandwidth during flight by using a preset value, as in this embodiment, the effect of such network changes can be avoided.

The bandwidth table 231 stores multiple pieces of bandwidth information corresponding to the drone 110 according to different location information. The bandwidth table 231 stores multiple pieces of different bandwidth information according to each identification information of the drone 110. That is, multiple pieces of bandwidth information are stored for each type of drone 110.

The multiple pieces of bandwidth information include bandwidth information that is set according to the latitude, longitude, and altitude. The latitude, longitude, and altitude each may have multiple values within a certain range, and bandwidth information for each three-dimensional location that corresponds to latitude, longitude, and altitude may be stored in the bandwidth table 231.

The bandwidth information transmitting unit 240 transmits first bandwidth information to the drone 110.

The first bandwidth information may further include information on the range of a specific area including a location corresponding to the first location information. In this case, the information on the range of a specific area including a location corresponding to the first location information is stored in the bandwidth table 231.

Figures 5, 6:
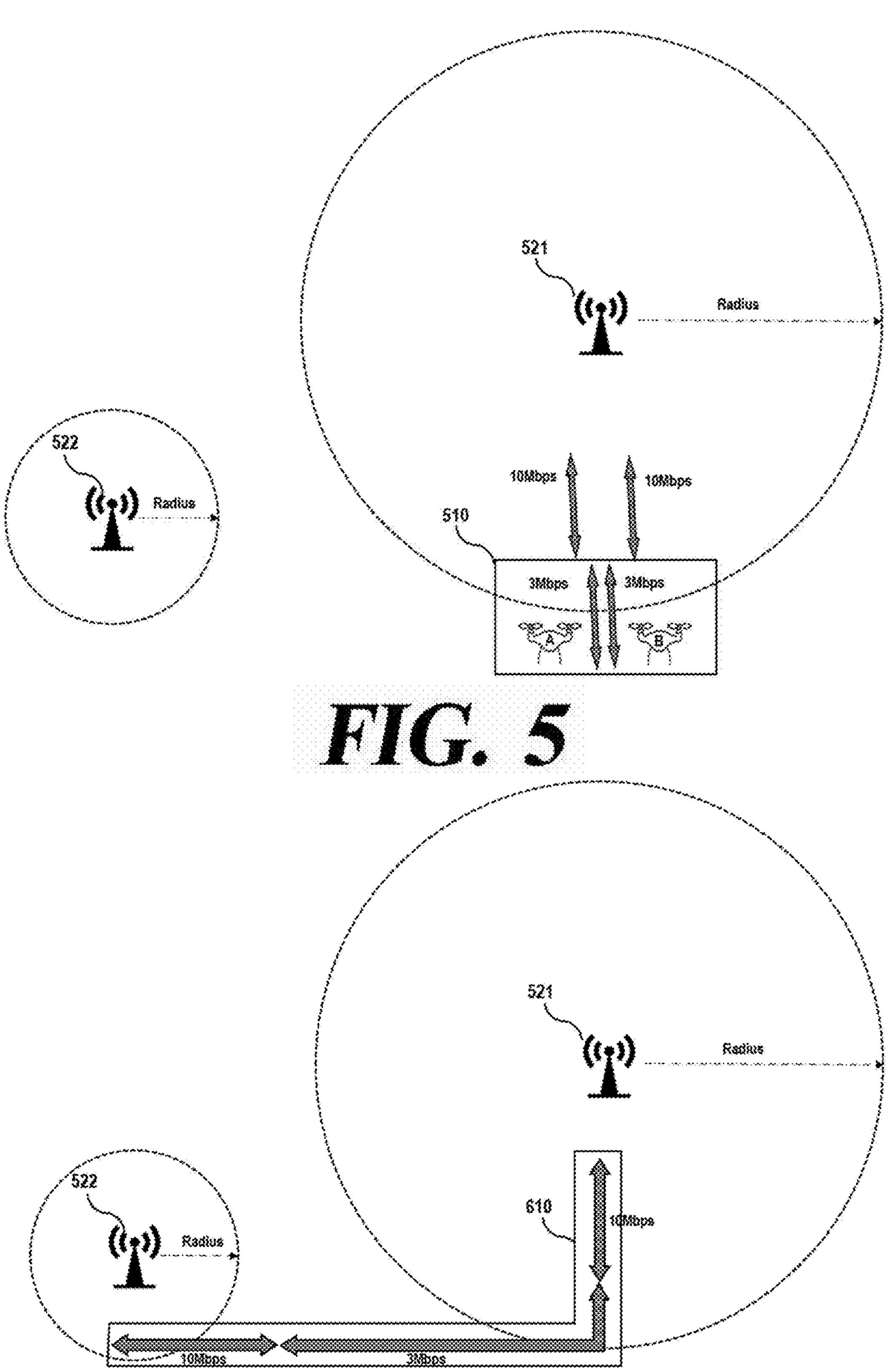
FIG. 5 is a view illustrating an example of dynamic application of bitrates when different drones are flying in proximity to one another.
FIG. 6 is a view illustrating an example of dynamic application of bitrates when a drone is flying outside the radius of a base station to carry out its flight mission.

FIG. 5 is a view illustrating an example of dynamic application of bitrates when different drones are flying in proximity to one another.

When the mobile terminal serves as a drone 110, it may fly manually to carry out its flight mission, or else, multiple drones A and B may be routed in advance to fly automatically.

In this case, the control center may spot drones flying in proximity to one another by collecting and analyzing waypoints of a number of drones.

In a case where multiple drones are in proximity to one another (for example, Drones A and B both exist in a specific rectangular area 510), network equipment installed on each drone may interfere in a mobile communication environment. Due to this, an interference problem arises because of multiple drones flying, which basically does not occur when a single drone is flying, and for this reason, the initial video stream bitrate for each drone may not be high enough to provide a video stream at a normal frame rate.

To resolve this problem, in the present disclosure, the bandwidth may be reduced by detecting in advance each drone's locations and altitudes at which their waypoints may overlap, so as to prevent unusual video streaming or flight control due to wireless traffic caused by multiple drones.

FIG. 6 is a view illustrating an example of dynamic application of bitrates when a drone is flying outside the radius of a base station to carry out its flight mission.

In a case where the drone 110 is set to have a waypoint within a specific area 610 to carry out its mission, the drone 110's wireless network is affected by how cell planning is done by a corresponding base station 521 and 522.

Generally, the area covered by the base station's cell planning is indicated as a circle, but it takes the form of an amoeba, not an ellipse, in reality, which cannot be accurately specified. Nevertheless, it is possible to measure network performance at a specific location and altitude when the drone 110 is flying.

If the bandwidth of a wireless network corresponding to a specific area is known owing to previous flight data, a bandwidth table 231 may be generated according to the latitude, longitude, and altitude of the drone 110. In this case, video is streamed at varying resolutions when the drone 110 is actually flying through its waypoints. That is, when the drone 110 is within the cell coverage of the base station 521 and 522, high-resolution video streaming may be performed, when the drone 110 is outside the cell coverage of the base station 521 and 522, low-resolution video streaming may be performed, and when the drone 110 gets back to within the coverage of the base station 521 and 522, high-resolution video streaming is possible.

In this way, the bandwidth may vary with the location of the drone 110, and therefore the network condition of the drone 110 may have minimal effect on the network for flight control.

As shown in FIG. 6, the bandwidth may vary with waypoints. That is, the bandwidth may vary with the type of mission flown or vary with the number of drones carrying out their mission.

Accordingly, in the bandwidth table, the bandwidth varying with waypoints may be set for each drone since the waypoints may vary depending on the type of mission flown by the drone 110.

That is, the number of drones to be flown may vary for different missions, and different bandwidths for different locations of each drone may be obtained and stored for each mission flown (i.e., for each waypoint).

Consequently, the identifier of a corresponding drone 110 and the type of mission carried out by the corresponding drone 110 may be obtained, and bandwidth information may be stored for the corresponding mission and drone identifier. As described previously, the stored bandwidth information, as used herein, refers to a bandwidth that is set according to the three-dimensional location of the drone 110.

Namely, the bandwidth table 231 may store bandwidth information related to missions flown by multiple drones including the drone 110, and multiple pieces of bandwidth information may be stored for each drone 110 for each mission flown.

In this case, the bandwidth information transmitting unit 240 may transmit to the drone 110 bandwidth adjustment information including a mission identifier, a drone identifier, and corresponding bandwidth information.

Figure 7:
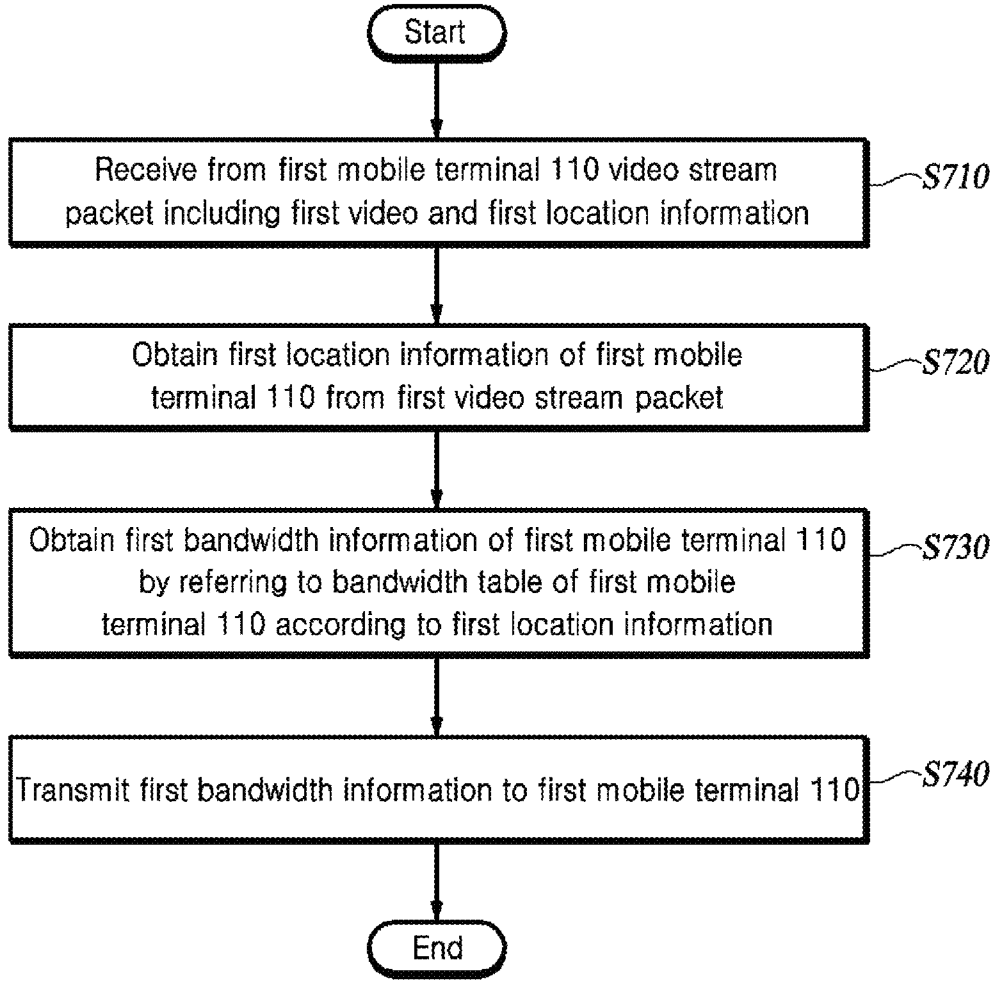
FIG. 7 is a flowchart of a video streaming method using a video streaming apparatus according an embodiment of the present disclosure.

FIG. 7 is a flowchart of a video streaming method using a video streaming apparatus 200 according an embodiment of the present disclosure.

Hereinafter, the video streaming method using the video streaming apparatus 200 will be described with reference to FIGS. 2A to 7.

A stream receiving unit 210 performs a stream reception process for receiving from a first mobile terminal 110 a video stream packet including an encoded, first video and first location information (S710).

A location obtaining unit 220 performs a location information obtaining process for obtaining first location information of the first mobile terminal 110 from a first video stream packet (S720).

A bandwidth information obtaining unit 230 performs a bandwidth information obtaining process for obtaining first bandwidth information of the first mobile terminal 110 by referring to a bandwidth table of the first mobile terminal 110 according to the first location information (S730).

A bandwidth information transmitting unit 240 performs a bandwidth information transmitting process for transmitting the first bandwidth information to the first mobile terminal 110 (S740).

Figure 8:
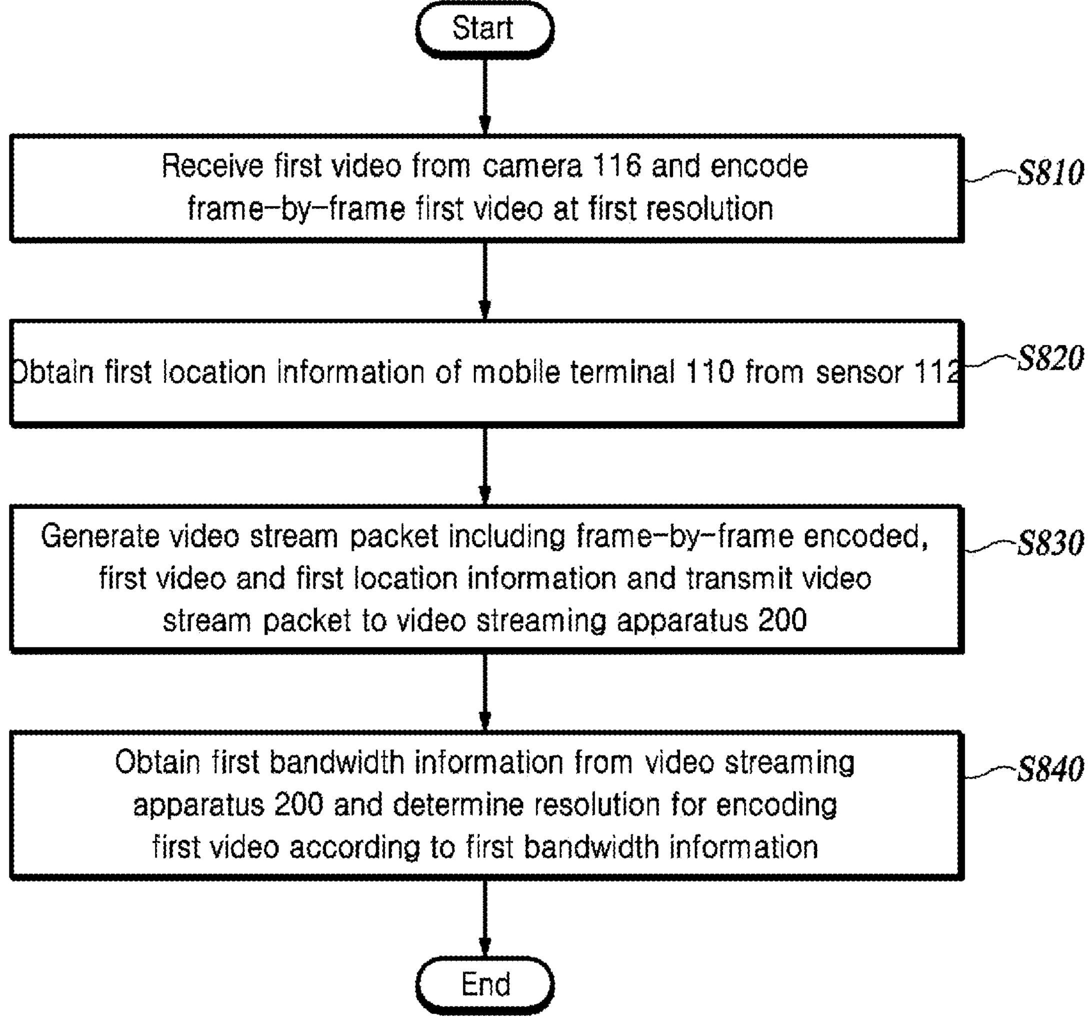
FIG. 8 is a flowchart of a video streaming method performed by a mobile terminal according to an embodiment of the present disclosure.

FIG. 8 is a flowchart of a video streaming method performed by a mobile terminal 110 according to an embodiment of the present disclosure.

Hereinafter, the video streaming method performed by the mobile terminal 110 will be described with reference to FIGS. 2A to 8.

An image receiving unit 111 performs an image receiving process for receiving a first video from a camera 116 mounted on the mobile terminal 110 and encoding the frame-by-frame first video at a first resolution to generate a frame-by-frame encoded, first video (S810).

A location data obtaining unit 113 performs a location data obtaining process for obtaining first location information of the mobile terminal 110 from a sensor 112 mounted on the mobile terminal 110 (S820).

A video stream transmitting unit 114 performs a video stream transmitting process for generating a video stream packet including the frame-by-frame encoded, first video and the first location information and transmitting the video stream packet to a video streaming apparatus 200 (S830).

A resolution deciding unit 115 performs a resolution deciding process for obtaining first bandwidth information from the video streaming apparatus 200, deciding a resolution for encoding the first video from the image receiving unit 111 according to the first bandwidth information, and determining the decided encoding resolution as a first resolution (S840).

Figure 9:
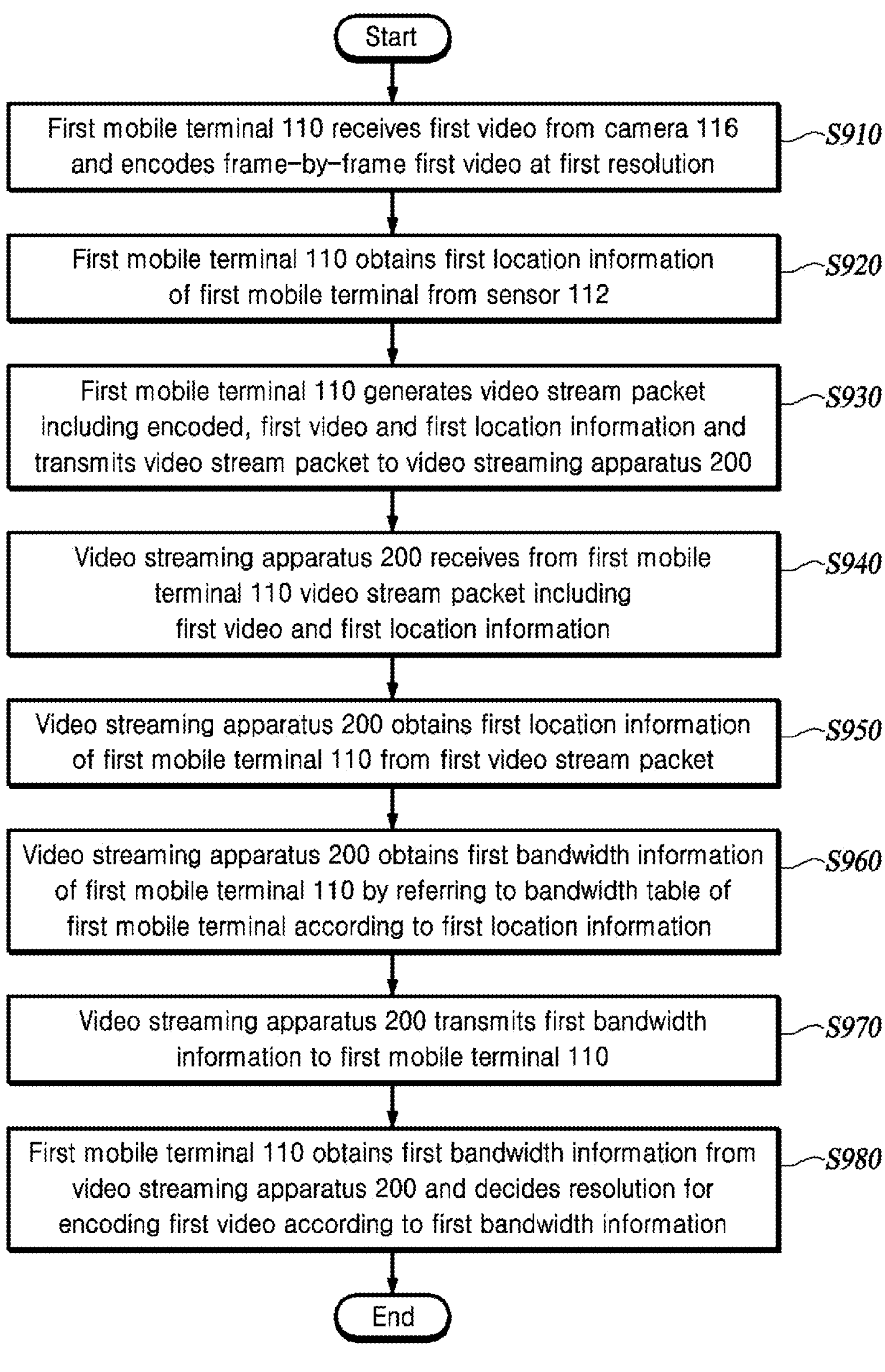
FIG. 9 is a flowchart of a video streaming method performed by a video streaming system according to an embodiment of the present disclosure.

FIG. 9 is a flowchart of a video streaming method performed by a video streaming system 300 according to an embodiment of the present disclosure.

Hereinafter, the video streaming method performed by the video streaming system 300 will be described with reference to FIGS. 2A to 9.

A first mobile terminal 100 performs an image receiving process for receiving a first video from a camera 116 mounted on the first mobile terminal 110 and encoding the frame-by-frame first video at a first resolution to generate a frame-by-frame encoded, first video (S910).

The first mobile terminal 100 performs a location data obtaining process for obtaining first location information of the first mobile terminal 110 from a sensor 112 mounted on the first mobile terminal 110 (S920).

The first mobile terminal 100 performs a video stream transmitting process for generating a video stream packet including the frame-by-frame encoded, first video and the first location information and transmitting the video stream packet to a video streaming apparatus 200 (S930).

The video streaming apparatus 200 performs a stream receiving process for receiving the video stream packet (S940).

The video streaming apparatus 200 performs a location information obtaining process for obtaining first location information from the video stream packet (S950).

The video streaming apparatus 200 performs a bandwidth information obtaining process for obtaining first bandwidth information of the first mobile terminal 110 by referring to a bandwidth table of the first mobile terminal 110 according to the first location information (S960).

The video streaming apparatus 200 performs a bandwidth information transmitting process for transmitting the first bandwidth information to the first mobile terminal 110 (S970).

The first mobile terminal 110 performs a resolution deciding process for obtaining first bandwidth information, deciding a resolution for encoding the first video from the image receiving unit 111 according to the first bandwidth information, and determining the decided encoding resolution as a first resolution (S980).

At least some of the components described with respect to the exemplary embodiments of the present disclosure may be implemented as a hardware element including at least one of a digital signal processor (DSP), a processor, a controller, an application-specific IC (ASIC), a programmable logic device (FPGA, etc.), and other electronic devices, and a combination thereof. In addition, at least some of the functions or processes described with respect to the exemplary embodiments may be implemented as software, and the software may be stored in a recording medium. At least some of the components, functions, and processes described with respect to the exemplary embodiments of the present disclosure may be implemented by a combination of hardware and software.

The method according to the exemplary embodiments of the present disclosure may be written as a program that is executable by a computer, and may be implemented as various recording media such as a magnetic storage medium, an optical reading medium, and a digital storage medium.

Implementations of the various techniques described herein may be conducted in digital electronic circuitry, or in computer hardware, firmware, software, or combinations thereof. The implementations may be conducted as a data processing device, for example, a programmable processor and a computer, or a computer program product, that is, an information carrier, for example, a computer program tangibly embodied in a machine-readable storage device (computer-readable medium) or radio signal for processing by the operations of a plurality of computers or for controlling the operations. A computer program, such as the computer program(s) described above, can be written in any form of programming language, including compiled or interpreted languages, and it can be deployed in any form, including as a stand-alone program or as a module, component, subroutine, object, or other unit suitable for use in a computing environment. A computer program can be deployed to be executed on one computer or on multiple computers that are located at one site or distributed across multiple sites and interconnected by a communication network.

Examples of processors suitable for processing a computer program include both general and special purpose microprocessors, and any one or more processors of any type of digital computer. Generally, a processor may receive instructions and data from a read only memory, a random access memory, or both the read only memory and the random access memory. Elements of a computer may include one or more processors that execute instructions, and one or more memory devices that store instructions and data. Generally, a computer may include one or more mass storage devices that store data, such as magnetic disks, magneto-optical disks, or optical disks, or may receive data from the mass storage devices, transmit data to the mass storage devices, or receive and transmit the data from and to the mass storage devices. Examples of information carriers suitable for embodying computer program instructions and data include semiconductor memory devices, for example, magnetic media such as hard disks, floppy disks, and magnetic tapes, optical media such as compact disc read only memories (CD-ROMs) and digital video discs (DVDs), magneto-optical media such as floptical disks, read only memories (ROMs), random access memories (RAMs), flash memories, erasable programmable ROMs (EPROMs), electrically erasable programmable ROMs (EEPROMs), and the like. The processor and the memory may be supplemented by, or included in, special purpose logic circuitry.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

The processor may run an operating system (OS) and software applications that run on the OS. The processor device also may access, store, manipulate, process, and create data in response to execution of the software. For purpose of simplicity, the description of a processor device is used as singular; however, one skilled in the art will appreciate that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

Likewise, although the operations are depicted in the drawings in a particular order, it should not be understood that such operations must be performed in that particular order or sequential order shown to achieve the desirable result or that all the depicted operations should be performed. In certain cases, multitasking and parallel processing may be advantageous. Moreover, the separation of various device components of the above-described embodiments should not be understood as requiring such separation in all embodiments, and it should be understood that the described program components and devices can generally be integrated together in a single software product or packaged into multiple software products.

The foregoing description is merely illustrative of the technical concept of the present embodiments. Various modifications and changes may be made by those of ordinary skill in the art without departing from the essential characteristics of each embodiment. Therefore, the present embodiments are not intended to limit but to describe the technical idea of the present embodiments. The scope of the technical concept of the embodiments is not limited by these embodiments.

The scope of protection of the various embodiments should be construed by the following claims. All technical ideas that fall within the scope of equivalents thereof should be interpreted as being included in the scope of the present embodiments.

What is claimed is:

1. A mobile terminal comprising:

at least one memory; and at least one processor coupled to the at least one memory and configured to cause the mobile terminal to:

obtain first bandwidth information from a video streaming apparatus, the first bandwidth information being generated based on geometry information including latitude, longitude, and altitude indicating locations associated with a first resolution;

receive a first video from a camera mounted on the mobile terminal;

obtain first location information of the mobile terminal from a sensor mounted on the mobile terminal;

determine whether the first location information corresponds to the locations of the first bandwidth information;

encode the first video at the first resolution or a second resolution lower than the first resolution based on whether the first location corresponds to the locations of the first bandwidth information;

generate a video stream packet including the encoded first video and the first location information; and transmit a packet including the encoded first video and the first location information to the video streaming apparatus, wherein the first bandwidth information includes information on a range of a specific area including the mobile terminal's location related with the first location information, and the mobile terminal does not transmit the first location information unless the mobile terminal's location is outside the range of the specific area.

2. The mobile terminal of claim 1, wherein the first location information includes a latitude, longitude, and altitude of the mobile terminal.

3. The mobile terminal of claim 1, wherein the encoded first video is multiplexed with the first location information within the packet.

4. A video streaming method comprising:

receiving, by a first mobile terminal, first bandwidth information from a video streaming apparatus, the first bandwidth information being generated based on geometry information including latitude, longitude, and altitude of the mobile terminal indicating locations associated with a first video encoding resolution;

receiving, by the first mobile terminal, a first video from a camera mounted on the mobile terminal;

obtaining, by the first mobile terminal, first location information of the mobile terminal from a sensor mounted on the mobile terminal;

encoding, by the first mobile terminal, the first video at the first resolution or the second resolution lower than the first resolution according to the first bandwidth information based on whether the first location information corresponds to the locations of the first bandwidth information;

generating, by the first mobile terminal, a video stream packet including the encoded, first video and the first location information and transmitting the video stream packet to the video streaming apparatus;

receiving, by the video streaming apparatus, the video stream packet including the first video and the first location information; and obtaining, by the video streaming apparatus, the first location information of the first mobile terminal from the video stream packet, wherein the first bandwidth information includes information on a range of a specific area including the mobile terminal's location related with the first location information, and the first location information is not transmitted unless the mobile terminal's location is outside of a specific area indicated by the first bandwidth information.

5. The video streaming method of claim 4, wherein the video streaming apparatus generates the first bandwidth information based on a bandwidth table that stores multiple pieces of bandwidth information related with the first mobile terminal according to multiple pieces of location information.

6. The video streaming method of claim 5, wherein the bandwidth table stores bandwidth information related to a waypoint through which a plurality of mobile terminals including the first mobile terminal fly, wherein bandwidth information for each piece of location information is stored based on a number of mobile terminals included in the waypoint.

* * * * *